(12) United States Patent
Gitman

(10) Patent No.: US 10,087,679 B2
(45) Date of Patent: Oct. 2, 2018

(54) SYSTEM AND METHOD FOR DETERMINING OPEN OR CLOSED STATE OF OPENABLE AND CLOSEABLE PASSAGES

(71) Applicant: LGN INTERNATIONAL LLC, Bay Harbor Island, FL (US)

(72) Inventor: Jacob Gitman, Bay Harbor Island, FL (US)

(73) Assignee: LGN INTERNATIONAL LLC, Bay Harbor Island, FL (US)

( * ) Notice: Subject to any disclaimer, the term of this patent is extended or adjusted under 35 U.S.C. 154(b) by 81 days.

(21) Appl. No.: 15/177,958

(22) Filed: Jun. 9, 2016

(65) Prior Publication Data

US 2017/0356238 A1  Dec. 14, 2017

(51) Int. Cl.
| | | |
|---|---|---|
| *E06B 7/28* | (2006.01) | |
| *G01D 5/24* | (2006.01) | |
| *G01D 5/26* | (2006.01) | |
| *G08B 13/08* | (2006.01) | |
| *G01D 5/241* | (2006.01) | |
| *G08B 25/00* | (2006.01) | |
| *G08B 13/18* | (2006.01) | |

(52) U.S. Cl.
CPC ............. *E06B 7/28* (2013.01); *G01D 5/241* (2013.01); *G08B 13/08* (2013.01); *G01D 5/24* (2013.01); *G01D 5/26* (2013.01); *G08B 13/18* (2013.01); *G08B 25/004* (2013.01)

(58) Field of Classification Search
CPC ........ G01D 5/24; G01D 5/241; G01D 5/2412; G01D 5/2417; G01D 5/26; E06B 7/00; E06B 7/28; G08B 13/00; G08B 13/02; G08B 13/08; G08B 13/18; G08B 13/181; G08B 13/183; G08B 13/189; G08B 13/1895; G08B 13/19; G08B 13/22; G08B 13/24; G08B 13/2491; G08B 13/2493; G08B 13/2494; G08B 13/26; G08B 19/00; G08B 19/005; G08B 23/00; G08B 3/00; G08B 3/10
USPC ........ 324/600–603, 605–607, 609, 637, 642, 324/647, 649, 658, 661, 662, 676, 679, 324/681, 684, 686, 76.11, 76.12, 130, 324/109, 457, 519, 548
See application file for complete search history.

(56) References Cited

U.S. PATENT DOCUMENTS

| | | | | |
|---|---|---|---|---|
| 7,977,903 B2* | 7/2011 | Kamiya | ........... | E05F 15/44 250/221 |
| 2012/0127317 A1* | 5/2012 | Yantek | ........... | G01V 8/14 348/156 |
| 2012/0200388 A1* | 8/2012 | Miura | ........... | H03K 17/955 340/5.51 |
| 2016/0054148 A1* | 2/2016 | Misfatto | ........... | E05B 39/00 73/514.02 |
| 2016/0168899 A1* | 6/2016 | Scheiermann | ..... | G08B 13/1663 49/506 |

(Continued)

*Primary Examiner* — Hoai-An D Nguyen
(74) *Attorney, Agent, or Firm* — Henry M. Feiereisen LLC

(57) ABSTRACT

In a system and a method for determining closed and open states of closeable and openable passages of an object, components are configured to determine whether a closeable and openable passage is in an open state or in a closed state and are all arranged exclusively on one spot associated with the passage providing closing and opening of the passage.

8 Claims, 22 Drawing Sheets

(56) References Cited

U.S. PATENT DOCUMENTS

2016/0247370 A1* 8/2016 Lamb .................... G08B 13/08
2017/0030737 A1* 2/2017 Elie ........................ E05F 15/70

* cited by examiner

Element 16 Pin 1 and 3 connected to SOC (element 7)
CX1 connected to sensing antenna element(19,20)

Element – 19 Recessed sensor sensing antenna

Top View

Bottom View

Element – 20 sensor sensing antenna

Top view

Bottom View

SYSTEM AND METHOD FOR DETERMINING OPEN OR CLOSED STATE OF OPENABLE AND CLOSEABLE PASSAGES

BACKGROUND OF THE INVENTION

The present invention relates to systems and methods for determining open or closed states of passages in an object, such as a door of an object, a window of an object, etc.

The systems and methods of this type are known in the art. A known system or method usually include different types of sensors and operates so that a signal is sent by a transmitter from one part of a door, a window, etc, for example from a door/window frame, and is then returned by an additional element attached to another part of the door, the window, etc. for example a door/window plate.

The known systems and methods include for example a two-part magnetic sensor based on a reed switch. The reed switch is sensitive to magnetic field, and once it feels a magnetic field it changes the switch state from open to close. The sensor based on a reed switch consist from two elements, first one is a core (SOC+Antenna+Reed switch) and a second one is a magnet. A subsequent analysis and determination whether the door or window is closed as desired, or is opened by an unauthorized person can be carried out. The disadvantage of these known systems and methods resides in that both components of the passage, such as of a door or a window, namely the door/window frame and the door/window plate must be provided with components of the system, which must cooperate with each other.

SUMMARY OF THE INVENTION

Accordingly, it is an object of the present invention to provide a system and a method for determining closed and open states of closeable and openable passages of an object, which are further improvements of the existing systems and methods.

In keeping with these objects and with others which will become apparent hereinafter, one feature of the present invention resides, briefly stated, in a system for determining closed and open state of closeable and openable passages of an object, that includes components which are configured to determine whether a closeable and openable passage is in an open state or in a closed state and which are all arranged exclusively on one spot associated with the passage providing closing and opening of the passage.

A further feature of the present invention resides in that the all components of the system are arranged exclusively on a plate of a door or a window of the passage.

A further feature of the present invention resides in that the all components of the system are arranged exclusively on a frame of a door or a window of the passage.

A further feature of the present invention resides in that the all components of the system are arranged exclusively on a surface, which is near a door or a window of the passage.

A further feature of the present invention resides in that the system includes include a radio frequency proximity sensor A further feature of the present invention resides in that the system includes include an optical proximity sensor.

A further feature of the present invention resides in that the system includes include a capacitance proximity sensor.

A further feature of the present invention resides in that the system includes a unit which is not necessarily arranged on the one element of the system, received a signal that the passage is in an open state, and provides at least one action as a reaction to the open or closed state of the passage.

A further feature of the present invention resides in that the system includes means for preliminary calibration and subsequent determination of the open state of the system based on deviation of obtained calibration data.

A further feature of the present invention resides in that the system is formed as a unitary device, in which all components are confined in a single housing and which is installed as a whole in the single corresponding spot or component of a closeable and openable passage of an object.

A further feature of the present invention resides in a method for determining closed and open state of closeable and openable passages of an object, which includes the steps of using components configured to determine whether a closeable and openable passage is in an open state or in a closed state, and arranging all components exclusively on one spot associated with the passage providing closing and opening of the passage.

A further feature of the present invention resides in arranging in the method all components exclusively on a plate of a door or a window of the passage.

A further feature of the present invention resides in arranging the method all components exclusively on a frame of a door or a window of the passage.

A further feature of the present invention resides in arranging the method all components exclusively on a surface which is near a door or a window of the passage.

A further feature of the present invention resides in using in the method a radio frequency proximity sensor A further feature of the present invention resides in using in the method an optical proximity sensor.

A further feature of the present invention resides in using in the method a capacitance proximity sensor.

A further feature of the present invention resides in including the method a unit which is not necessarily arranged on the one element of the system, received a signal that the passage is in an open state, and provides at least one action as a reaction to the open state of the passage.

A further feature of the present invention resides in preliminary calibration of the components the method and subsequent determination of the open state of the passage based on deviation of open state data from obtained calibration data.

A further feature of the present invention resides in that it is formed as a unitary device, in which all components are confined in a single housing and which is installed as a whole in the single corresponding spot or component of a closeable and openable passage of an object.

The novel features of the present invention are set forth in the appended claims.

The invention itself however will be best understood from the following description of the preferred embodiments which is accompanied by the following drawings.

DESCRIPTION OF THE PREFERRED EMBODIMENTS

A security system for determining closed and open state of closeable and openable passages of an object according to the present invention can be installed in a plurality of locations. FIGS. 1-8 illustrate some possible locations of the system.

Figure 1:
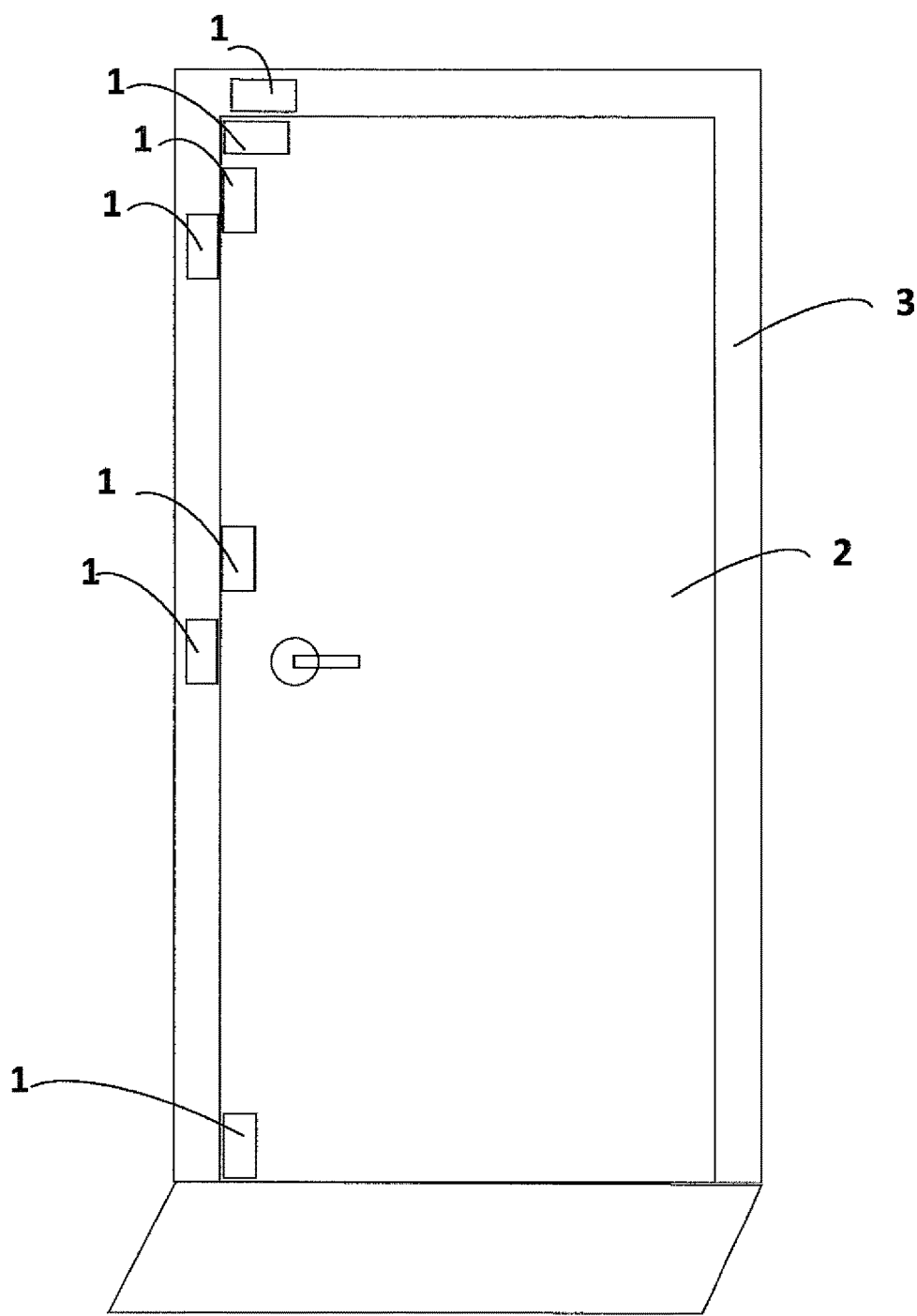
FIGS. 1-4 are side views of doors in open and closed positions with a system of the present invention for determining closed and open state of closeable and openable passages of an object, having components arranged on several locations.
Figure 2:
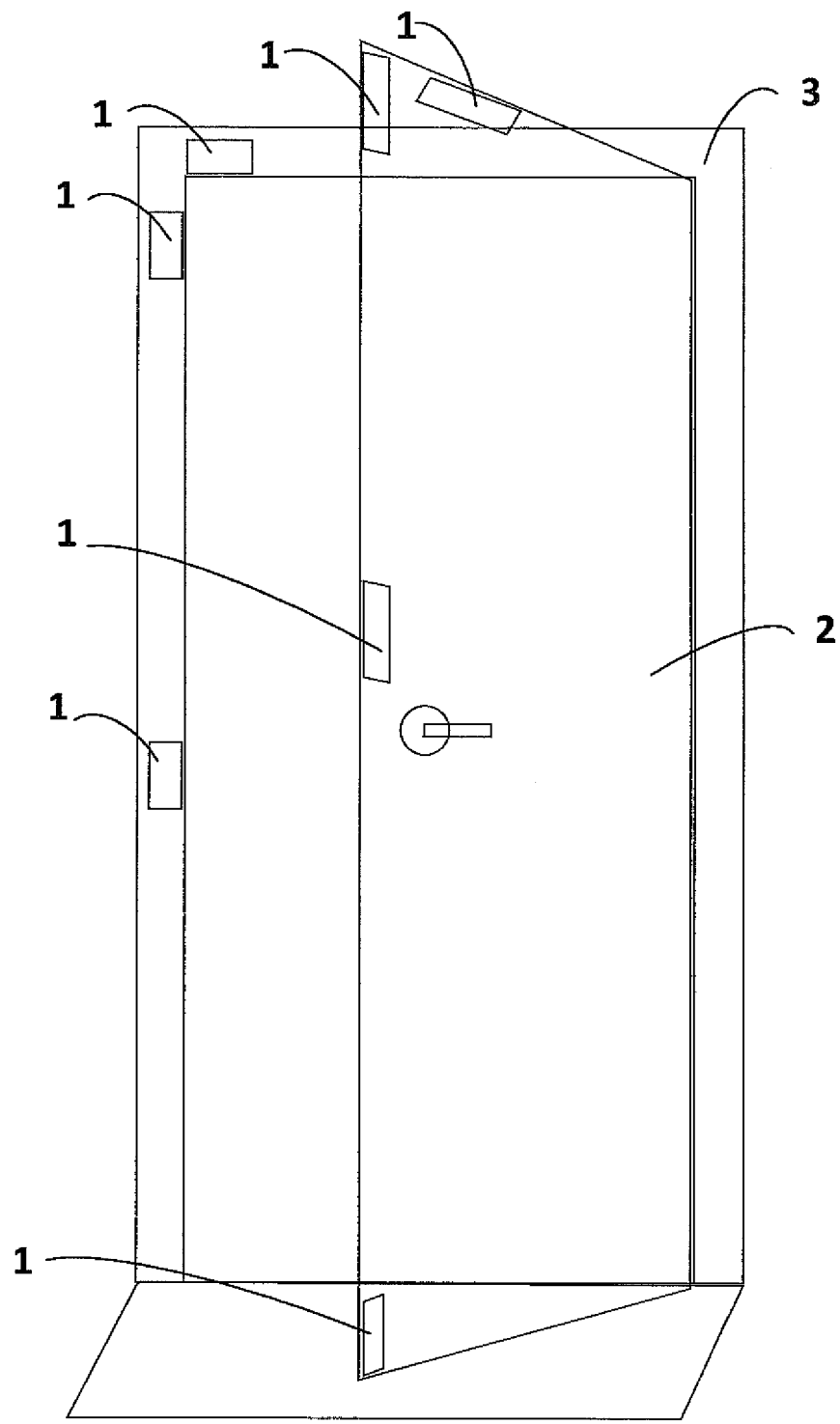

FIGS. 1 and 2 show the system identified with reference numeral 1 and used with a closeable and openable door having a door plate 2 and a door frame 3, with FIG. 1 in a closed position and FIG. 2 in an open position. The system 1 can be arranged on the door plate 2 or on the door frame 3 in the upper left corner of the door plate 2, below the upper left corner of the door plate 2, on the upper horizontal part of the door frame 3, in the upper region of the left vertical part of the door frame 3, in the left middle region of the door plate 2, in the middle region of the left vertical part of the door frame 3, in the lower left corner of the door plate 2, or on other locations. The system 1 can include a radio frequency proximity sensor, an optical proximity sensor or a capacitance proximity sensor.

Figure 3:
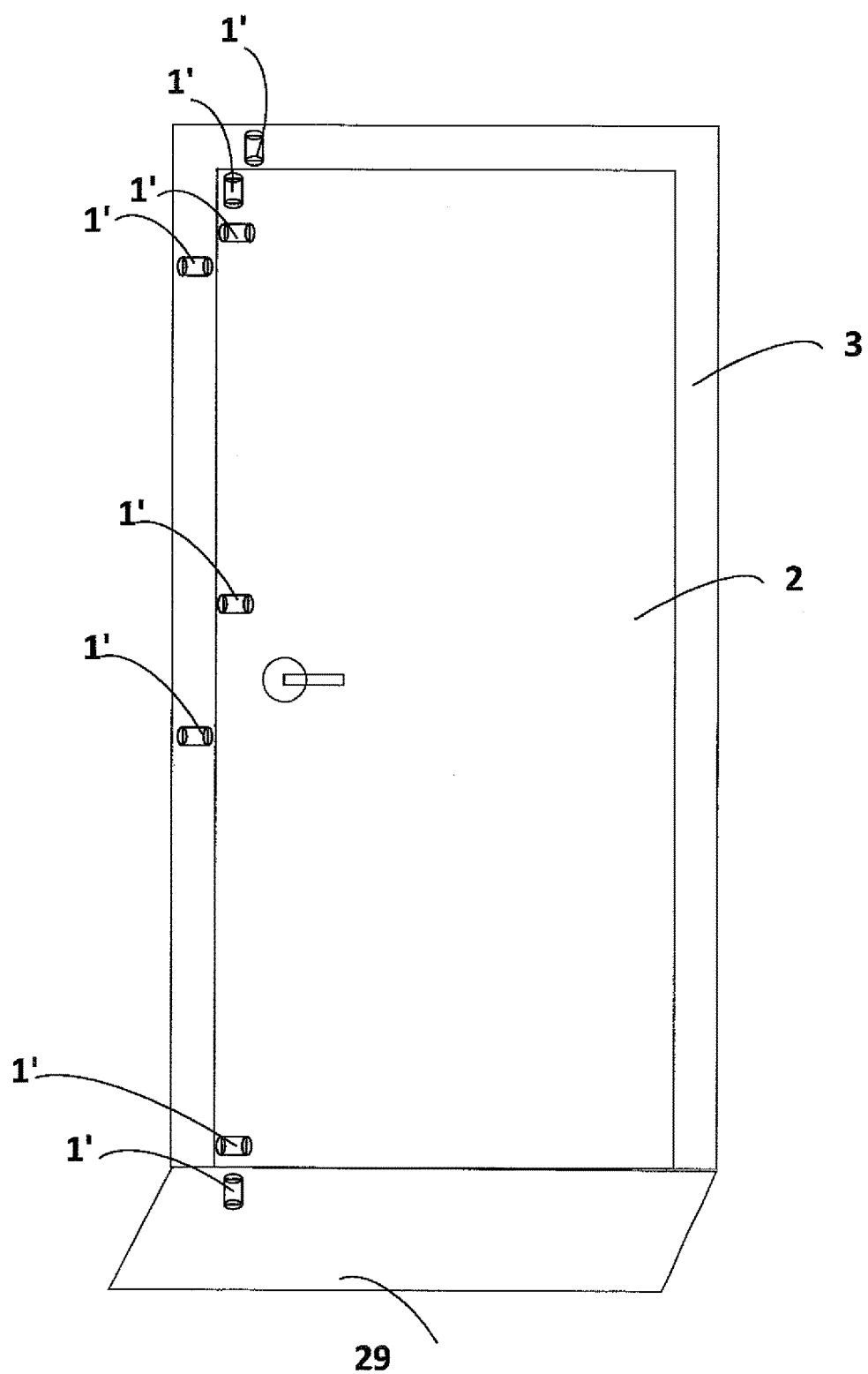
Figure 4:
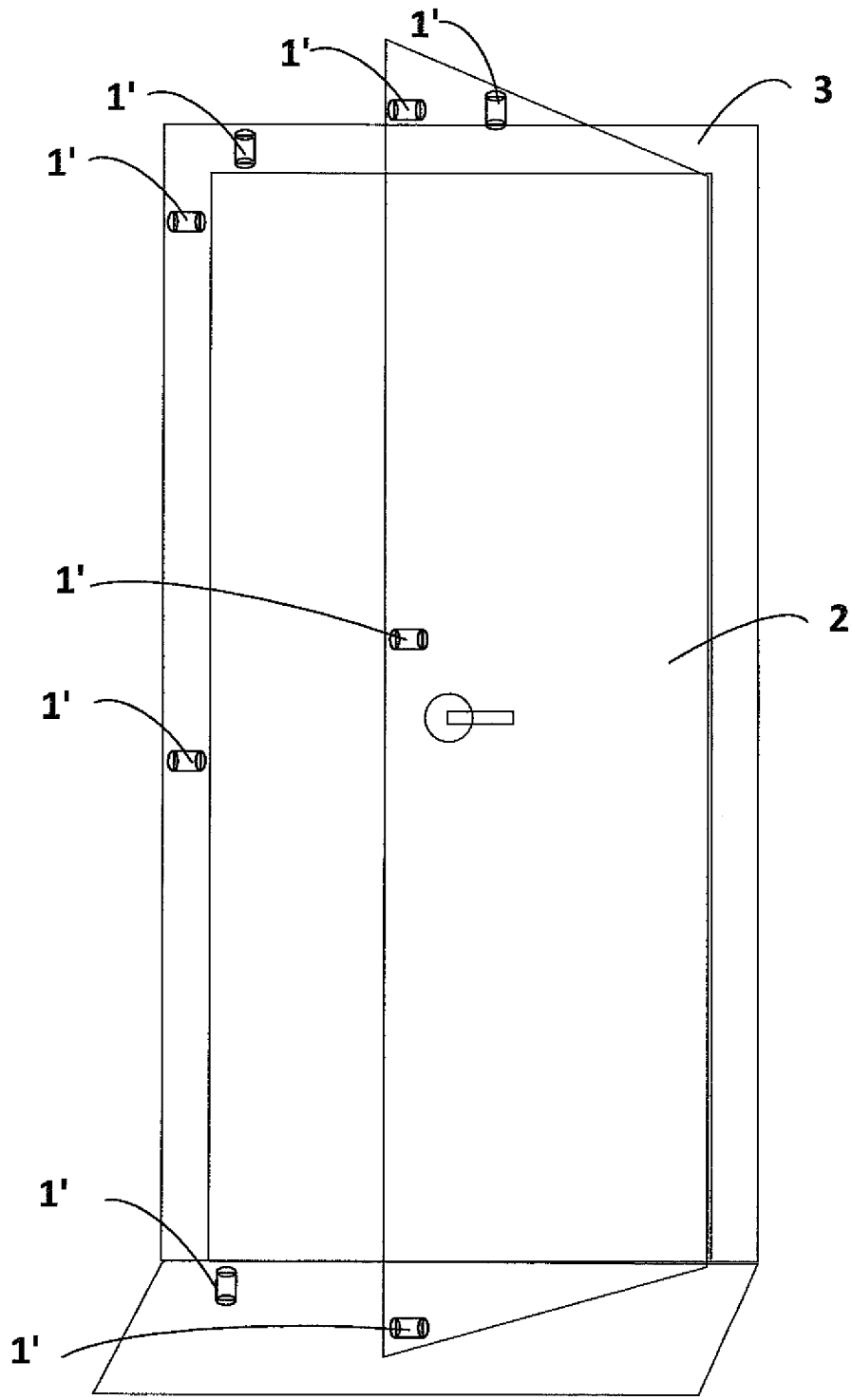

FIGS. 3 and 4 show the system identified with reference numeral 1' and used with a closeable and openable door having a door plate 2 and a door frame 3, with FIG. 3 in a closed position and FIG. 4 in an open position. The system 1' is formed as a recessed system, and it can be arranged in the door plate 2 or in the door frame 3 in the upper left corner of the door plate 2, below the upper left corner of the door plate 2, on the upper horizontal part of the door frame 3, in the upper region of the left vertical part of the door frame 3, in the left middle region of the door plate 2, in the middle region of the left vertical part of the door frame 3, in the lower left corner of the door plate 2, and even in an area close to the door, for example in a ground, in a threshold adjoining a residence, etc. The system 1' can include a radio frequency proximity sensor, an optical proximity sensor or a capacitance proximity sensor.

Figure 5:
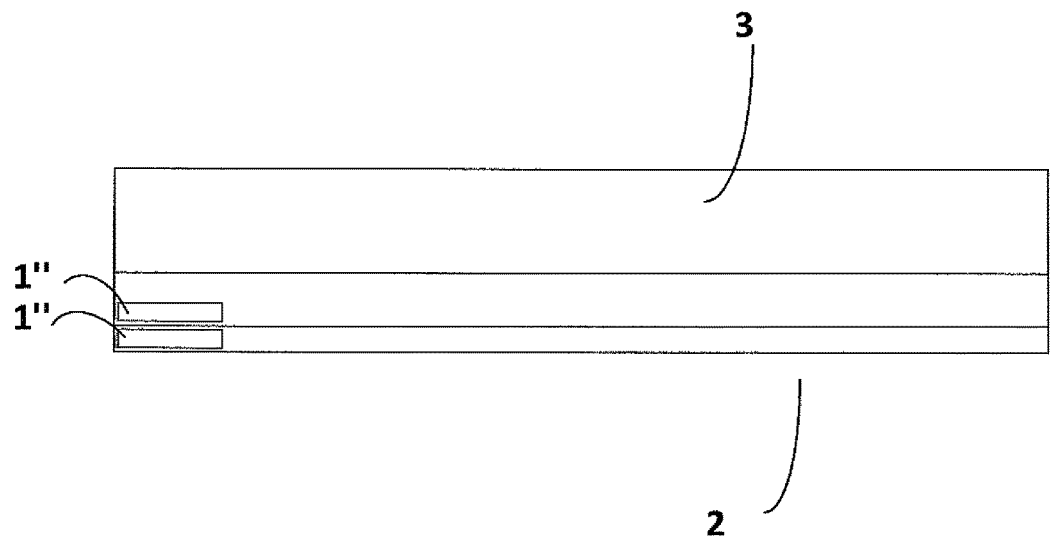
FIGS. 5-8 are plan views of doors in open and closed positions with the system of the present invention having components arranged on several locations.
Figure 6:
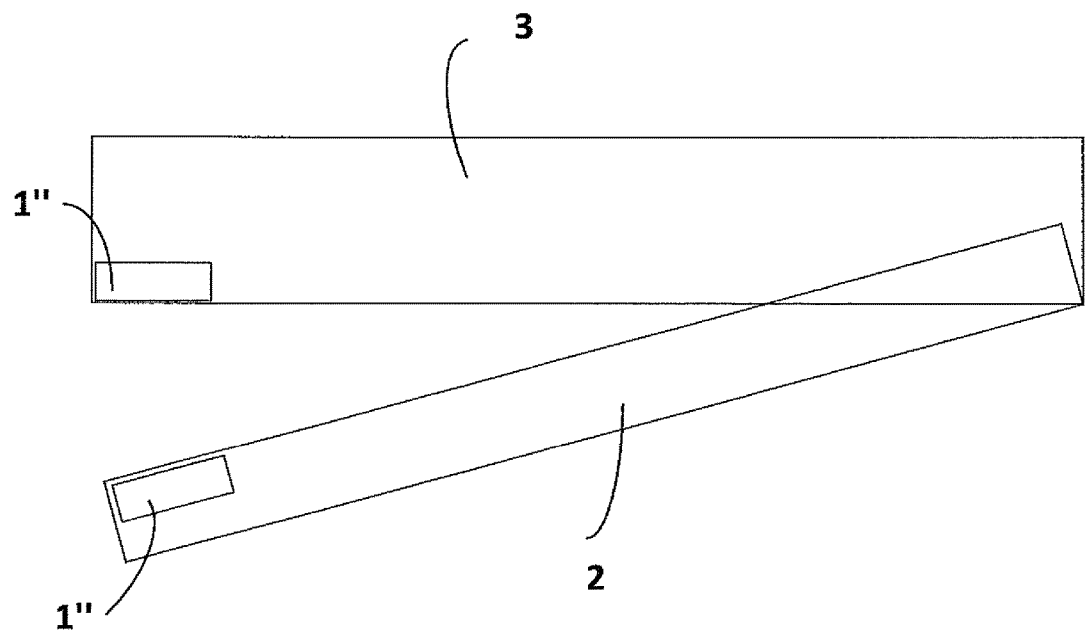

FIGS. 5 and 6 show the system identified with reference numeral 1" and used with a closeable and openable door having a door plate 2 and a door frame 3, with FIG. 5 in a closed position and FIG. 6 in an open position. The system can be arranged in the top surface of the door plate 2 or in the top surface of the door frame 3. The system 1" can include a radio frequency proximity sensor, an optical proximity sensor or a capacitance proximity sensor.

Figure 7:
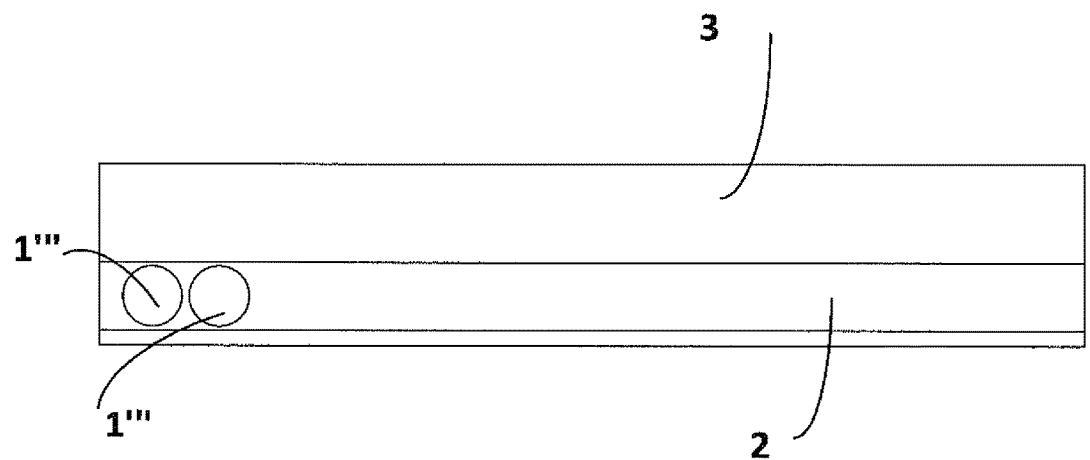
Figure 8:
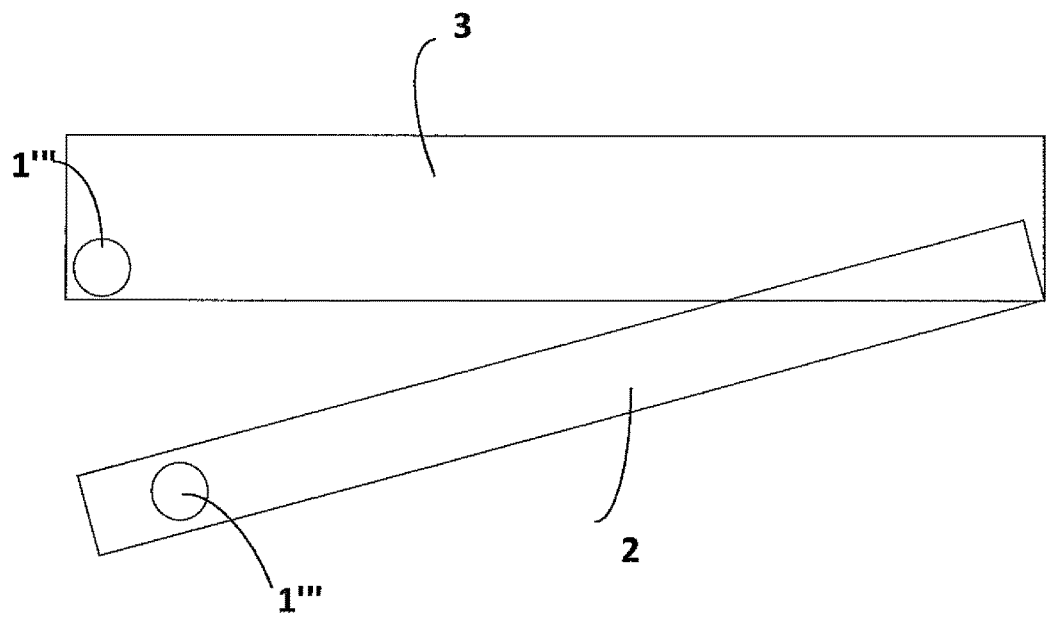

FIGS. 7 and 8 show the system identified with reference numeral 1"" and used with a closeable and openable door having a door plate 2 and a door frame 3, with FIG. 7 in a closed position and FIG. 8 in an open position. The system 1"" is formed as a recessed system, and it can be arranged in the top surface of the door plate 2 or in the top surface of the door frame 3. The system 1"" can include a radio frequency proximity sensor, an optical proximity sensor or a capacitance proximity sensor.

Figure 9:
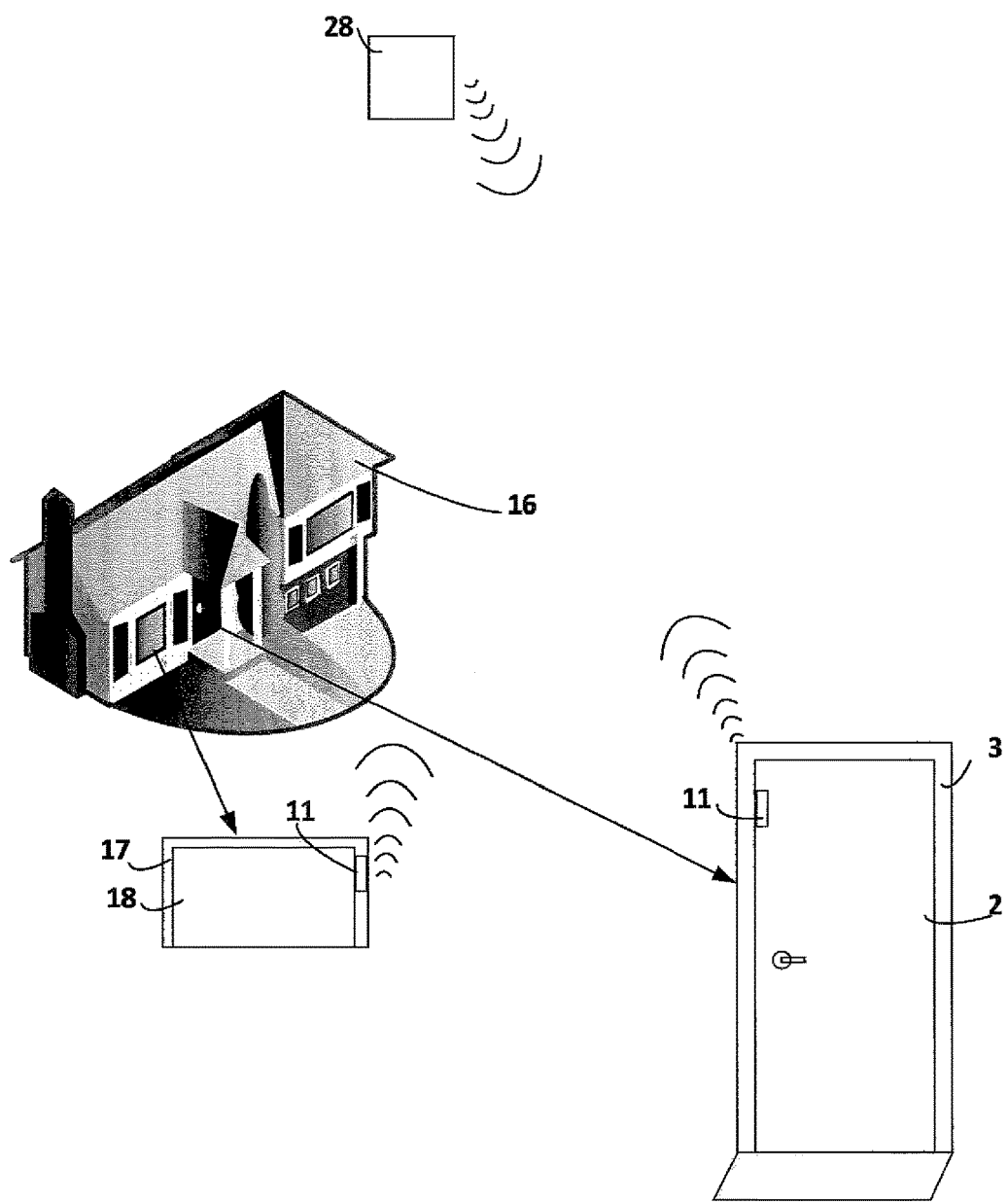
FIG. 9 is a further view of the system of the present invention arranged in association with a door and a window of an object.

The system according to the present invention can be provided for an object 16 such as a residence, an office space, a hotel, a bank, a shop, in any facility that have passages, garages and windows etc. shown in FIG. 9. In particular in can be associated with its door having the door plate 2 and the door frame 3 as shown in FIGS. 1-8. A similar system 11 can be associated with its window having a window frame 17 and a window plate or pane 18. As explained above, the system includes the sensor. The sensor is configured as a transceiver. It monitors via the sensor a current state of the door or the window. When it detect via the sensor that the door or the window is no longer closed, it sends a signal to a control panel 28 which can include an alarm unit, such that it can activate an alarm, send a signal to a user—for example to his cell phone, send a signal to a company which monitors security of the object, activate an alarm buzzer, turn on the light in an area of the object, lock all doors and windows, call police, call neighbors and etc., or all of this.

Figure 10:
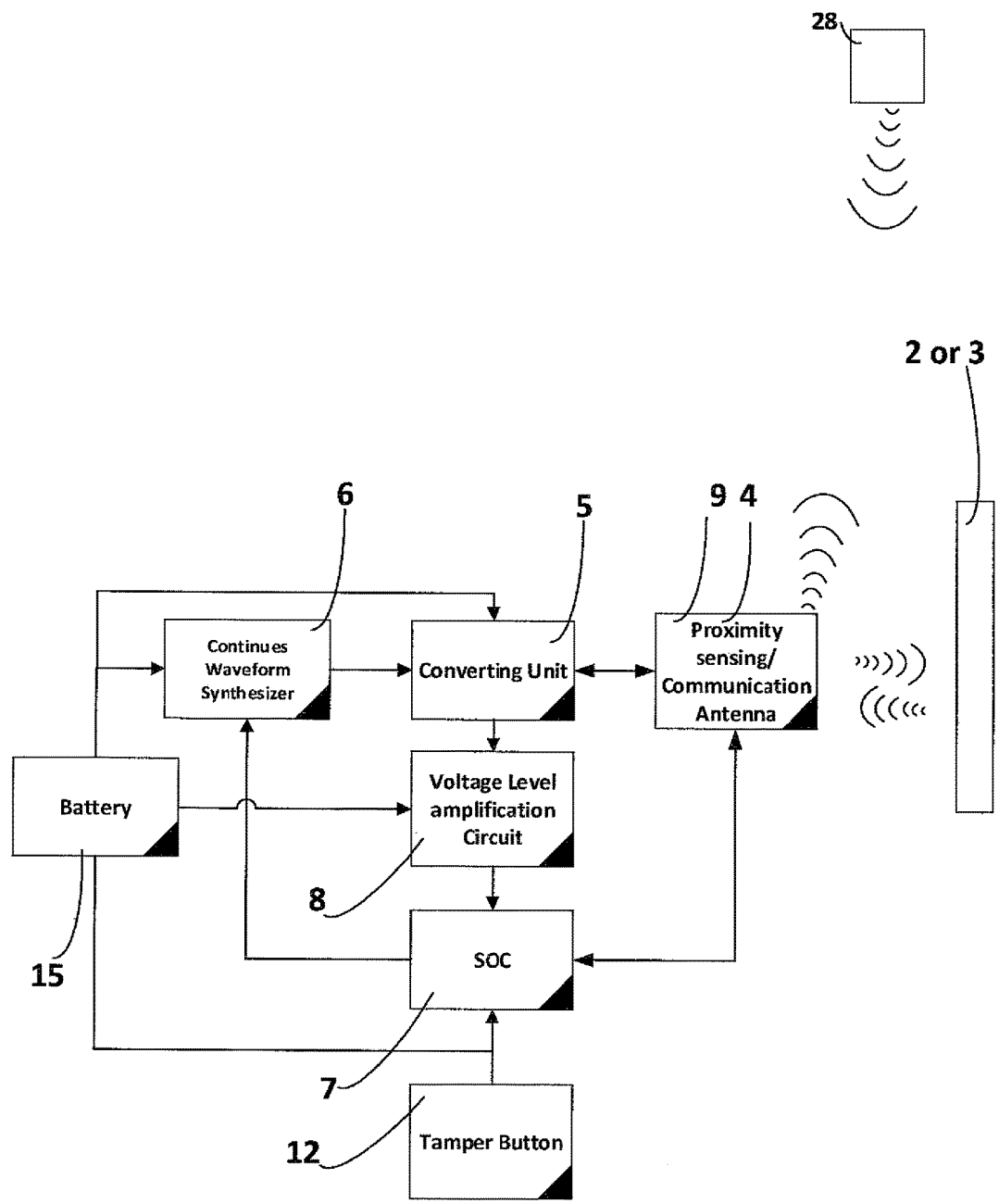
FIGS. 10 and 11 are views showing components of the system according to the present invention with two different types of antennas.

FIG. 10 show the system formed as a radio frequency proximity sensor. It has a single antenna unit with a proximity sensing antenna 4 and a communication antenna 9, a converting unit 5, a continuous waveform synthesizer 6, a SOC or integrated circuit 7, a voltage level amplification circuit 8, a tamper button 12 and a battery 15. It is operative to sense changes in door/window open/closed states.

Figure 11:
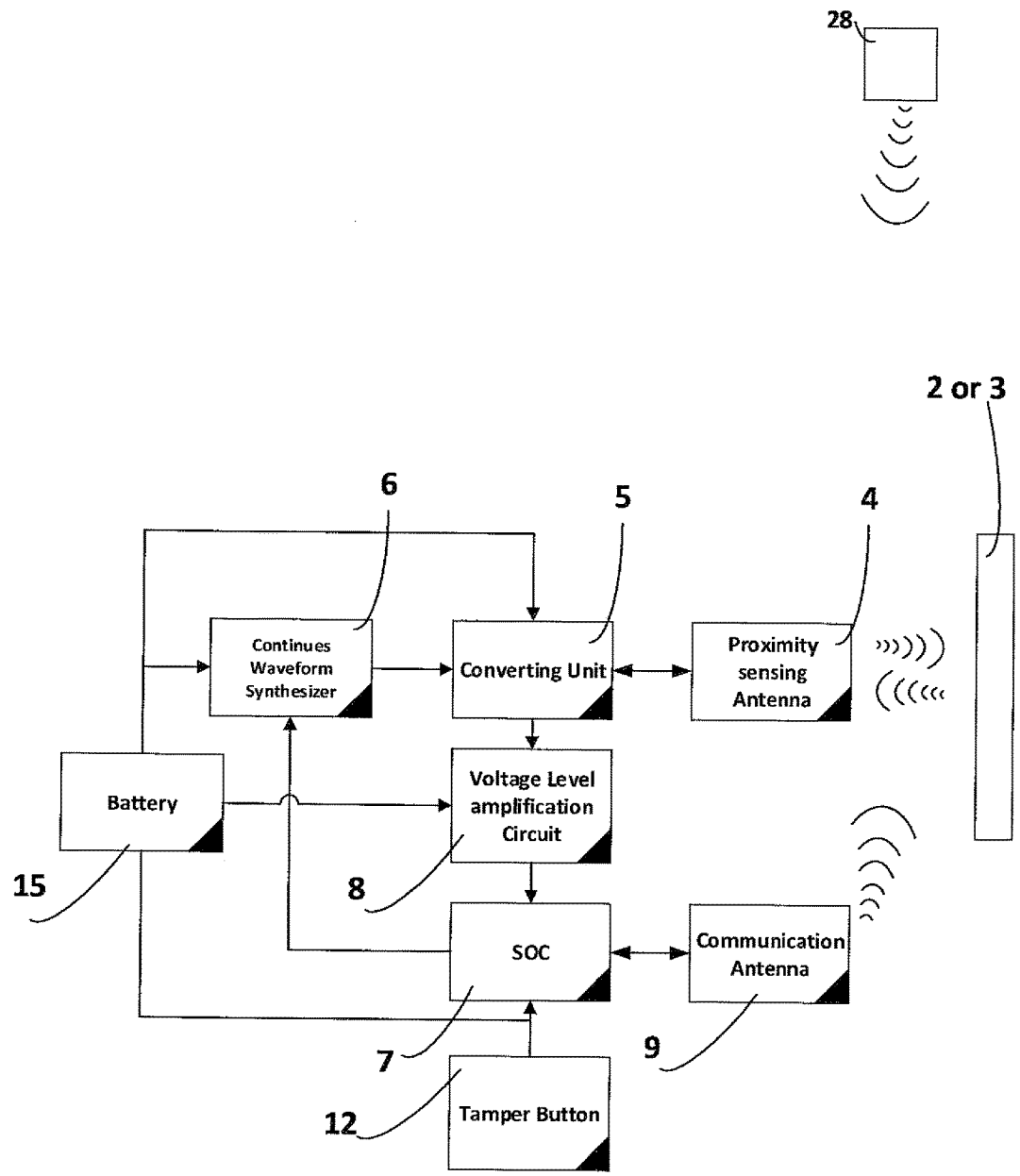

FIG. 11 shows the system formed as a radio frequency proximity sensor and substantially corresponding to the security system of FIG. 10. It however has a proximity sensing antenna 4 and a communication antenna 9 formed as separate antennas. It further has a converting unit 5, a continuous waveform synthesizer 6, a SOC or integrated circuit 7, a voltage level amplification circuit 8, a tamper button 12, and a battery 15. It is operative to sense changes in door/window open/closed states.

The system is installed on a door/window plate or a door/window frame in such way that the sensing antenna faces a door/window frame or a door/window plate. A user closes the door/window, and then the system has to be adjusted to sensing levels relative to the surface it is installed on. Adjusting/calibration for relative level can be carried out in the following manner. When the door is closed, the tamper button 12 is held for a few seconds (for example 3 sec.) and it initiates the calibration procedure. The SOC 7 activates the continues waveform synthesizer 6, the continues waveform synthesizer 6 generate a high frequency signal and transmit it to the proximity sensing antenna 4 thought the converting unit 5. The proximity sensing occurs when the proximity sensing antenna 4 works in conjunction with the converting unit 5, and the converting unit 5 converts the signal that the door is in closed state to a voltage level that is sensed by the SOC 7, which measures and saves a signal level. The measured signal level is used as a reference for door closed state.

After the adjustment, the system will operate in the following manner. The sensor is turned on, and the SOC 7 turns on. Turn on/off cycles depends on a system configuration, for example the SOC 7 can turn on every 1 second. The SOC 7 sends an enabling command to the continuous waveform synthesizer 6 and the latter generates a high frequency signal and transmit it to the proximity sensing antenna 4 thought the converting unit 5. The proximity sensing is carried out when the proximity sensing antenna 4 works in conjunction with the converting unit 5. If the sensor is installed on the door and the door is in open state, the SOC 7 activates the continues waveform synthesizer 6 each select time frame (e.g. 1 sec) and transmits a high frequency waveform thought the converting unit 5 to the proximity sensing antenna 4. The proximity sensing antenna 4 transmit the high frequency waveform and received reflected waveform from the corresponding surface. The reflected waveform enter the proximity sensing antenna 4 and then passes to the converting unit 5 that converts the signal to voltage. The voltage level amplification circuit 8 amplifies the voltage signal to satisfy input signal level requirements of the SOC 7. The SOC 7 measures the received signal, and compares the signal level to reference level saved during the adjusting procedure. If the door/window is in open state, the signal level will be different from the reference signal, and the system detects the proximity deviation. The battery 15 supplies energy to power the elements 6, 6, 7 and 8.

When the system sends the signal from a door/window frame to a door/window plate, or vice versa, then if the door/window is closed and the door/window plate is in the proximity of the door/window frame the received signal indicates that the door/window is closed. However, when the door/window plate is moved away from the door/window frame, and there is a gap between them, the signal received by the antenna is different, this is recognized by the security system, and the signal is supplied to the alarm unit 28. Then the control system 28 which can include the alarm unit will carry our corresponding actions specified above. When user leaves the object provided with the system, he usually closes the door/window and activates the alarm system. When an unauthorized person opens the door/window, the system senses that the door/window plate in no longer in the proximity of the door/window frame as explained above, and sends the signal to the alarm unit.

Figure 12:
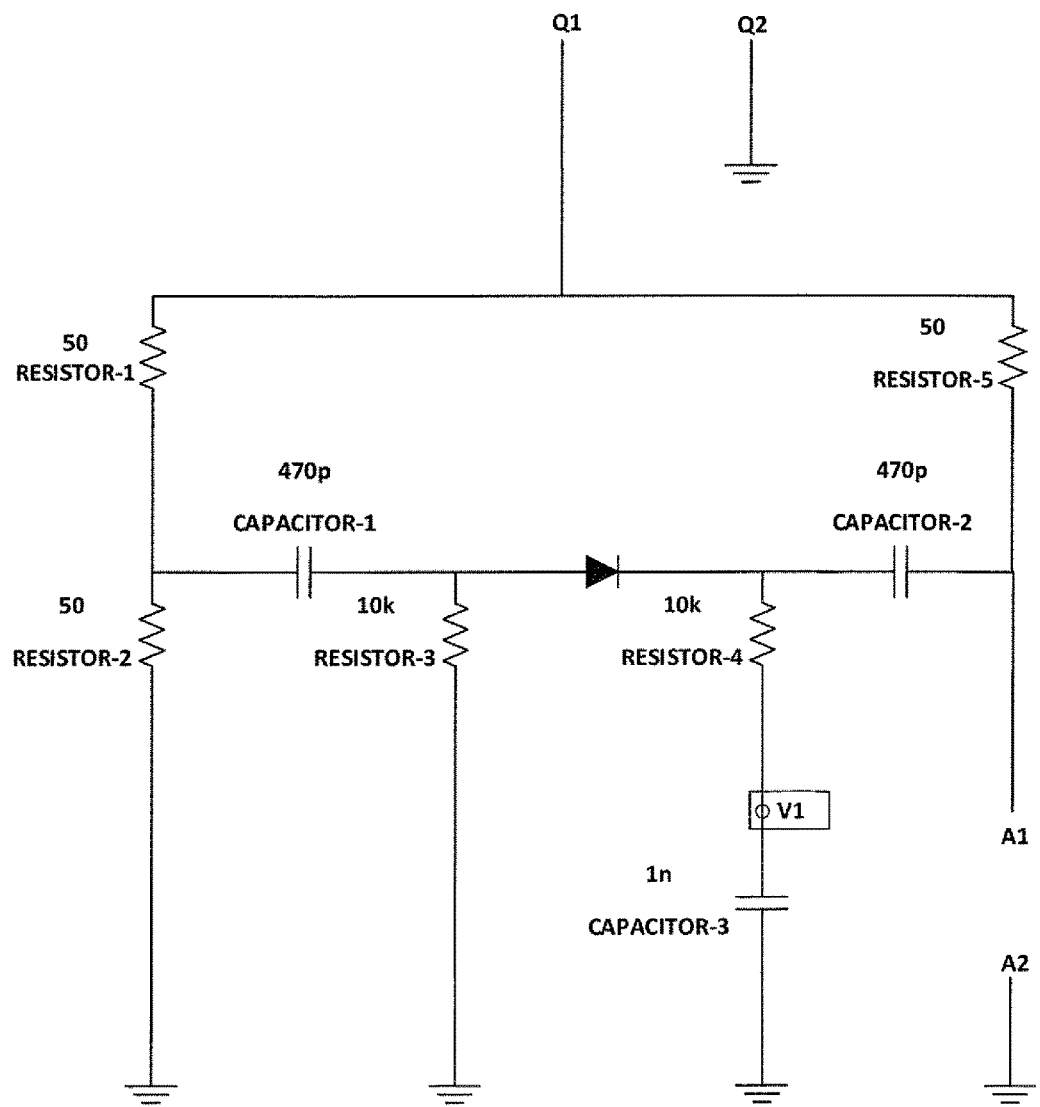
FIG. 12 is a view showing a converting unit of the security system according to the present invention.

FIG. 12 shows details of a variation of transformation of a high frequency signal to voltage level of the converting unit 5 of the system formed as the radio frequency proximity sensor. Antenna impedance variation is measured relative to 50Ω impedance, that connect between A1 and A2 points, in such way that antenna feed connects to A1 point and ground point connects to A2. The continuous wave synthesizer 6 is connected between point O1 and O2 such way that a synthesizer output connects to O1 and synthesizer ground connects to O2. Then V1 represents a measure relative to ground for the bridge unbalance and hence the ratio between antenna impedance and the 50Ω reference. In other words, V1 represents the voltage source changes relatively to antenna impedance. Moreover the antenna impedance varies in dependence of approximation to any object.

Figure 13:
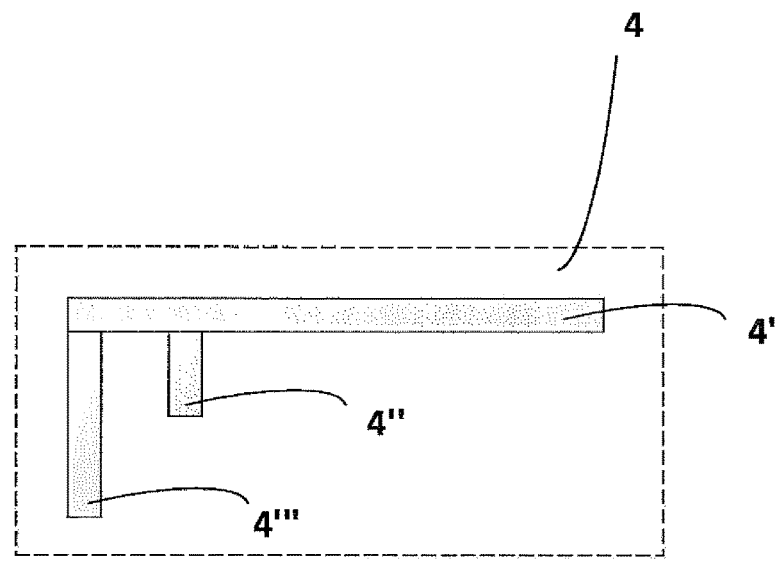
FIG. 13 is a view showing antennas used in the system according to the present invention.
Figure 13:
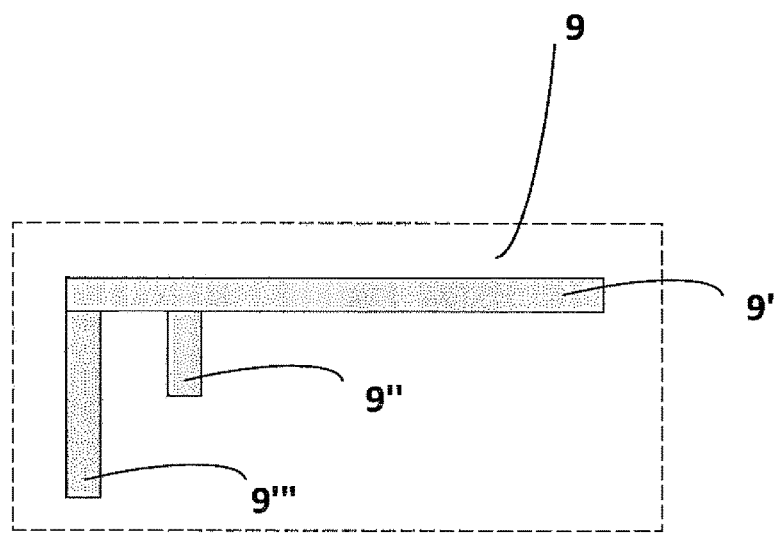

FIG. 13 shows one of possible implementations for a proximity antenna and a communication antenna. The proximity detection antenna 4 and the communication antenna implemented in a sensor inverted F antenna type. They are constructed correspondingly from elements 4', 4", 4''' and 9', 9", 9'''. The elements 4" and 9" are antenna feeds connected to the transceiver, while the elements 4', 4''' and 9', 9''' are connected to a sensor ground plane. When the system transmits through the proximity antenna the signal is supplied to the antenna through the feed element 4". When the system transmits through the communication antenna the signal is supplied to the antenna through the feed element 9". When the same antenna is used for communication and for proximity detection, the proximity detection signal and the communication signal are supplied through the same feed but in different time frames.

Figure 14:
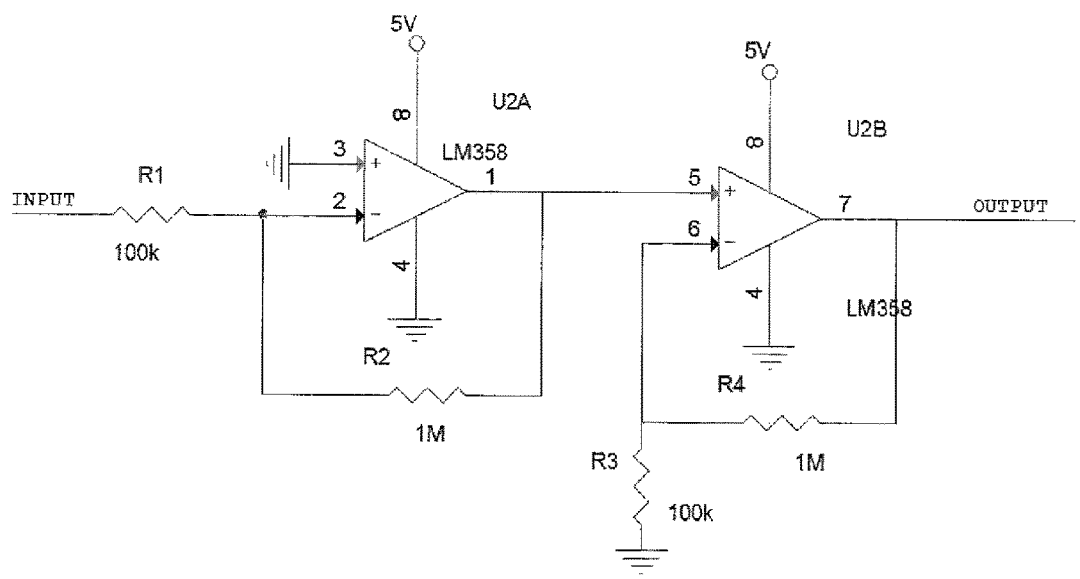
FIG. 14 is a view showing a voltage amplification circuit of the system according to the present invention.

The voltage level amplification circuit 8 shown in FIGS. 10 and 11 amplifies received signal to higher level. This voltage amplification circuit can be formed in several ways, for example as shown FIG. 14 and based on LM324 Integrated Circuit (IC) operation amplifier. In the operation the circuits implements two-stage gain.

The conversion unit 5 shown in FIGS. 10 and 11 converts a signal received by the antenna to a voltage level. This converting unit can be formed in several ways, for example as shown in FIG. 12.

Figure 15:
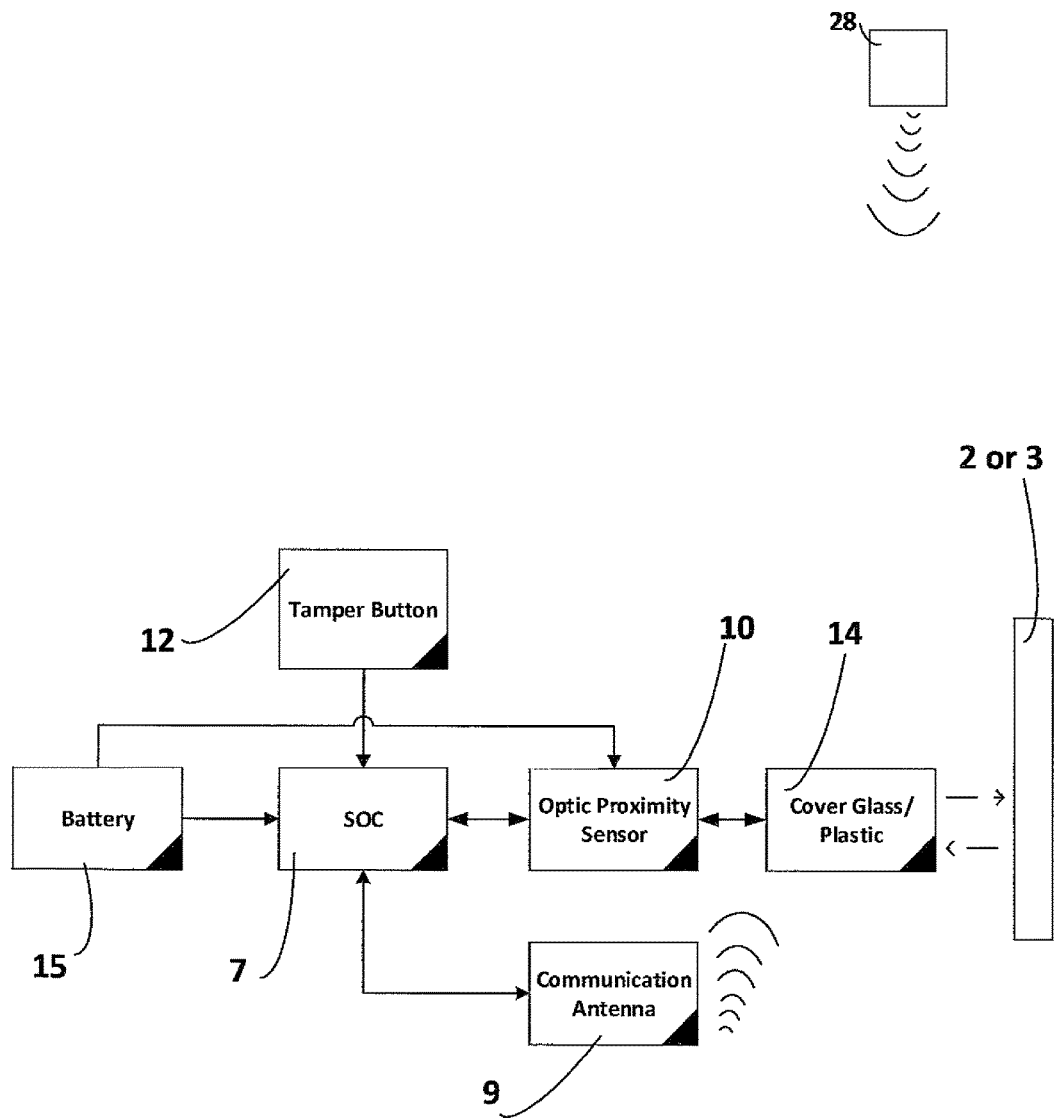
FIGS. 15-17 are views showing the system according to the present invention with optical proximity sensor and reflection lens with covers.
Figure 16:
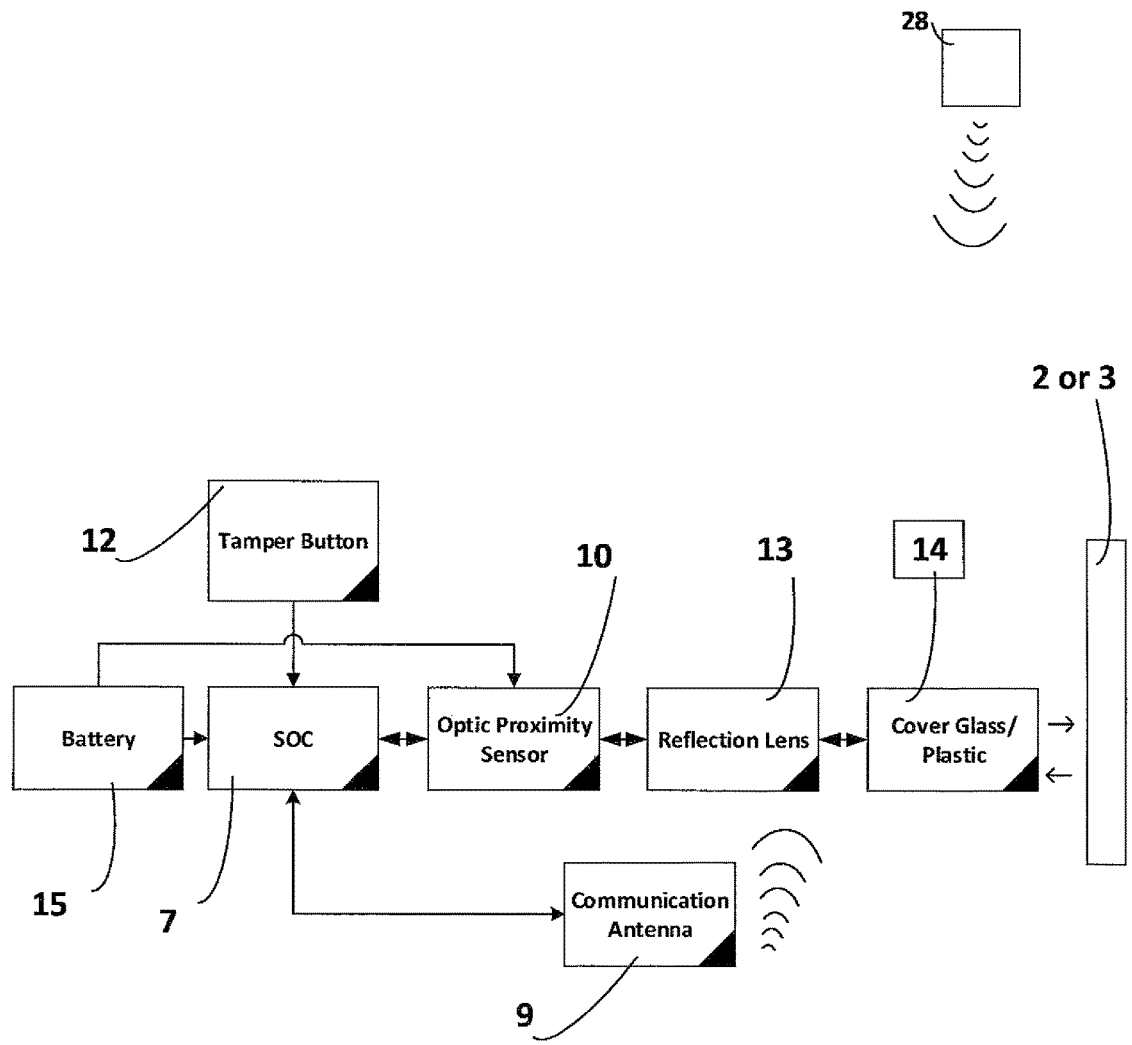

The system shown in FIGS. 15 and 16 is based on an optical proximity sensor which also includes a two-way transceiver element composed from elements 7 and 9. The system includes a battery 15, an optical proximity detection sensor 10, a cover glass/plastic element 14, an on Chip-SOC element 7, an antenna 9 for two-way communication with a control panel, and a control system 28 which can be provided with the alarm unit.

It can include a cover glass/plastic element 14 is a narrow glass/plastic or other transparent material piece. It blocks accumulation of dust on the sensor. The proximity sensor (non-recessed) include a reflection lens 13, while a recessed proximity sensor does not have the reflection lens. Both sensors have the communication antenna 9.

Opening of the door plate 2 determined by optical proximity detection is carried out by the fixed contact wireless transceiver which can be installed on the door frame 3 or the door plate 2 or the surface element 29. It is operative for sensing changes in door/window open/close state.

The communication antenna 9 is operative for two-way communication between the optical proximity detection fixed contact wireless transceiver and the alarm unit 28. The antenna element 9 is preferably an inverted F antenna operating on high frequency. It is operative for communicating, for example, at 434, 868, 915 or 2445 MHz.

The (SOC) unit 7 is an integrated circuit (IC) that integrates all components of a computer or other electronic system into a single chip. It may contain digital, analog, mixed-signal, and often radio-frequency functions—all on a single chip substrate. EM357 manufactured by Silicon Labs Company is an example of commonly used SOC.

The optical proximity sensor 10 measures the time the light which is taken to travel to the nearest object and to reflect back to the sensor TOF (Time-of-Flight). The optical proximity sensor 10 is an of shelf product, such as for example VL6180X manufacture by STMicroelectronics. The battery 15 supplies the required energy to power the elements 7 and 10.

The system can be installed in the door plate or door frame, or on a surface under the door as shown in FIGS. 1-4, so that a part of the system on which the proximity detection element is located faces the door plate or the door frame. In other words, if this element is installed on the door plate, the proximity detection element should face the door frame, and vice versa.

In operation the optical proximity sensor 10 transmits light ray and measures the time of flight (TOF). From retrieved data of the time of flight the optic proximity sensor 10 calculates the distance between the door plate and the door frame, or vice versa., and transmits the data to the SOC 7.

When the door is closed, the optical proximity sensor 10 measures a distance between the door frame and the door plate. Once the door is opened the distance measured by the optic proximity sensor 10 varies. This is recognized by the optic proximity sensor 10 and the signal can be supplied to the alarm unit 28. The alarm unit then acts according to previous configuration. When a user leaves the object through the door he closes the door and activates the alarm system. When an unauthorized person opens the door the optic proximity sensor 10 senses that the door plate is no longer in a proximity of the door frame and sends a signal to the control panel 28 which then can activate an alarm, sends a signal to a user, etc.

The system can be installed in a door plate or a door frame or under a door surface. It can be installed over a door plate or a door frame perimeter or under a door surface as shown in FIGS. 1-4. In this case the proximity detection sensor has to face a door plate or a door frame. In other words when the proximity detection sensor is installed in the door plate, it should face a door frame, and vice versa. The top view is shown on FIGS. 5-8.

In operation of the system, the optic proximity sensor 10 transmit light ray and measures the time of flight (TOF). From the retrieved TOF data, the optic proximity sensor 10 calculates the distance between the door plate to the door frame, or vice versa (depending on whether it is installed into the doorframe or doorplate), and transmit the data to the SOC 7.

When the door is closed, the optic proximity sensor 10 measures a distance between the door frame and the door plate. Once the door opened the distance measured by the optic proximity sensor 10 varies. This is recognized by the optic proximity sensor 10, and the signal can supplied to the control panel 28. Then the alarm unit will act according to it configuration. When a user leaves the object with a door passage he usually closes the door and activates the alarm system. When an unauthorized person opens the door/window/garage, the proximity sensor 10 senses that the door plate in no longer in the proximity of the door frame and sends the signal to the control panel. Then the control panel 28 which can be configured as an alarm unit, such that it can activate an alarm, send a signal to a user—for example to his cell phone, send a signal to a company which monitors security of the object, activate an alarm buzzer, turn on the light in an area of the object, lock all doors and windows, call police, call neighbors and etc., or all of this.

In addition, any of the radio frequency sensors, optical sensors, and capacitance sensors can be adjust for connection to a cell phone directly via short-range communication technology like Bluetooth.

Moreover, it can be connected directly to Cloud via cellular communication (cellular provider or WIFI access point). For example, an alarm unit of the control panel 28 can be programmed to operate on the cloud and notify the user for any variation in sensor status: whether e.g a door is open or closed. Also, it can act as an alarm system and activate a buzzer that is also connected to an alarm system software that operates on the cloud, via cellular communication, WIFI access point.

The operation of the system includes the following:

User closes the door (FIGS. 1,3,5,7). The proximity sensor 10 adjusts close door proximity levels or it can work without adjustment based on absolute levels recorded in the SOC 7. In case when the optic proximity sensor 10 has to adjust close door proximity levels it could be adjusted/calibrated in several ways, for example as in the option presented below:

Hold the tamper button 12 for 3 sec., and it initiates the calibration procedure. It will initiate the calibration process immediately or after a few seconds depending on sensor configuration, SOC 7 activates proximity sensor 10, Proximity sensor 10 measures the distance between a door frame and a door plate and transmit obtained data to SOC 7, SOC 7 saves the obtained data as a reference.

After the adjustment is accomplished the system will operate in following matter:

System is turned on, and the SOC 7 turns on. Turn on/off cycles depends on a system configuration. For example the SOC 7 can be turned on every 1 second, SOC 7 send enabling command to the proximity sensor 10. The proximity sensor 10 through reflection lens 13 (FIG. 16 only, non-recessed sensor) and cover glass plastic 14 measures a distance between a door frame and a door plate and sends measured data to SOC 7, SOC 7 compare a signal level to a reference level saved during the adjustment, If the door is in an open state, the distance will be different form the reference distance. In this way, the system detects an open door/window/garage state or a closed door/window/garage state.

In operation of the system shown in FIG. 16 the optic proximity sensor 10 transmit light ray thought the elements 13 and 14, and the later measures the time of flight (TOF). From the retrieved TOF results the optic proximity sensor 10 calculates the distance between the door plate and the door frame, or vice versa (depending on whether the system is installed in the door frame or is the door plate), and transmit the data to the SOC 7.

When the door is closed, the optical sensor system measures a distance between the door frame and the door plate. Once the door is opened, the distance measured by the optical sensor system varies. This is recognized by the optical sensor system and the signal can supplied to control panel 28. Then the alarm unit system will act according to it configuration. For example when a user leaves the object with the door passage he usually closes the door and activates the alarm system. When an unauthorized person opens the door, the optic proximity sensor 10 senses that the door plate is no longer in the proximity of the door frame and sends the signal to the control panel 28. Then the control panel 28 which can be configured as an alarm unit, such that it can activate an alarm, send a signal to a user—for example to his cell phone, send a signal to a company which monitors security of the object, activate an alarm buzzer, turn on the light in an area of the object, lock all doors and windows, call police, call neighbors and etc., or all of this.

In addition, any of the presented radio frequency, optical and capacitance sensors can be adjusted for connection to a cell phone directly via a short-range communication technology like Bluetooth.

Moreover, they can be connected directly to a Cloud via a cellular communication (cellular provider or WIFI access point). For example, the alarm unit of the control panel can be a programmed so that it operates on the cloud and will notify the user for any variation in a sensor status, e.g a door is open or closed. Also, it can act like an alarm system and activate a buzzer that is also connected to the alarm system software that operates on the cloud, via a cellular communication, WIFI access point).

The operation of the system is explained below. A user close the door FIGS. 1, 3, 5 and 7. The optic sensor has to adjust close door proximity levels or it can work without adjustment based on absolute levels recorded in the SOC 7. In case that optic sensor have to adjust close door proximity levels, it could be adjusted in several ways, one of the option listed below:

Hold the tamper button 12 for 3 sec. It initiates the calibration procedure immediately or a few seconds later, depending on sensor configuration, SOC 7 activates optic proximity sensor 10, Optic proximity sensor 10 trough element 13 measures the distance between a door frame and a door plate and transmits those data to SOC 7, SOC 7 saves measured data as a reference level.

After the adjustment is accomplished the system will operate in the following manner:

System is turned on, SOC 7 turns on. Turn on/off cycles depends on system configuration. E.g. SOC 7 turns on every 1 second, SOC 7 sends enabling command to optic proximity sensor 10. Optic proximity sensor 10 trough element 13 measures the distance between a door frame and a door plate and sends the measured data to SOC 7, SOC 7 compares the signal level to reference level saved during the adjusting procedure.

If the door is in open state, the signal level will be different from the reference signal level. In this way, the sensor detects an open door state or a closed door state.

Figure 17:
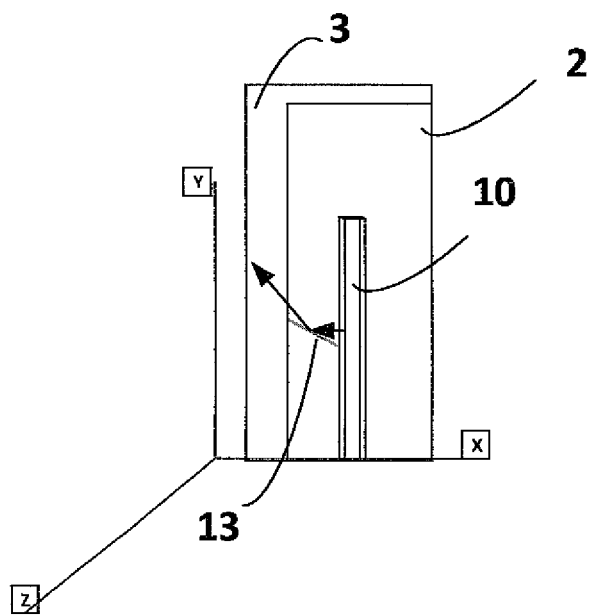

FIG. 17 shown a system with a proximity detection sensor 10 by element 10 and a reflection lens element 13.

The system can be installed on a door plate 2 and transmits the light waveform trough element 13: 45° reflection lens to a door frame 3. If the door is closed, the light is reflected from the door frame through the lens 13 to the sensor. For each wave light transition, the optic sensor measures the TOF, in comparison with a value of TOF when the sensor was calibrated. This way the system can identify door open position or a door closed position. The optic reflection lens element provides spinning of an optical sensor wave by 45° degrees.

Figure 18:
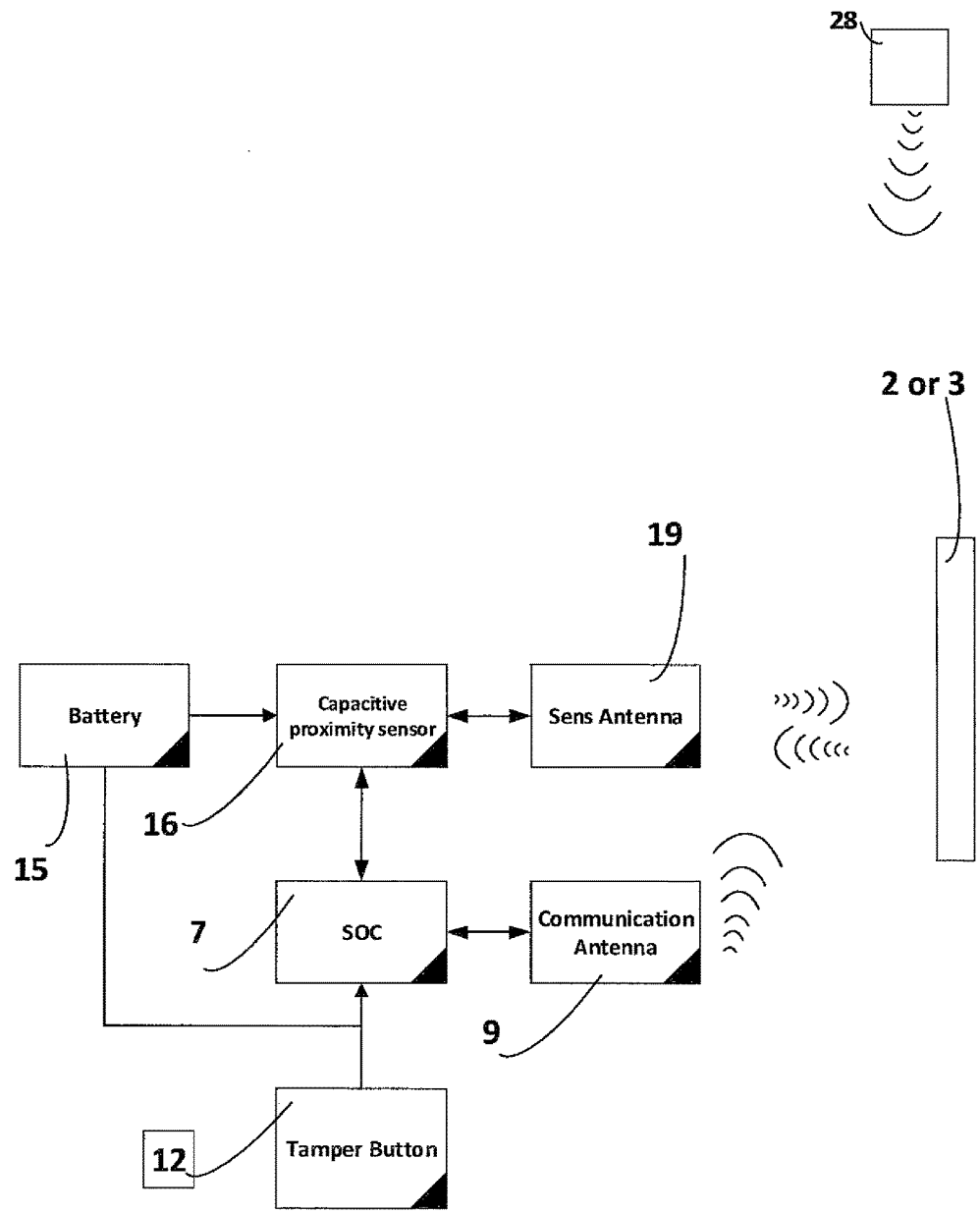
FIGS. 18 and 19 are views showing the system according to the present invention with capacitive proximity sensor.
Figure 19:
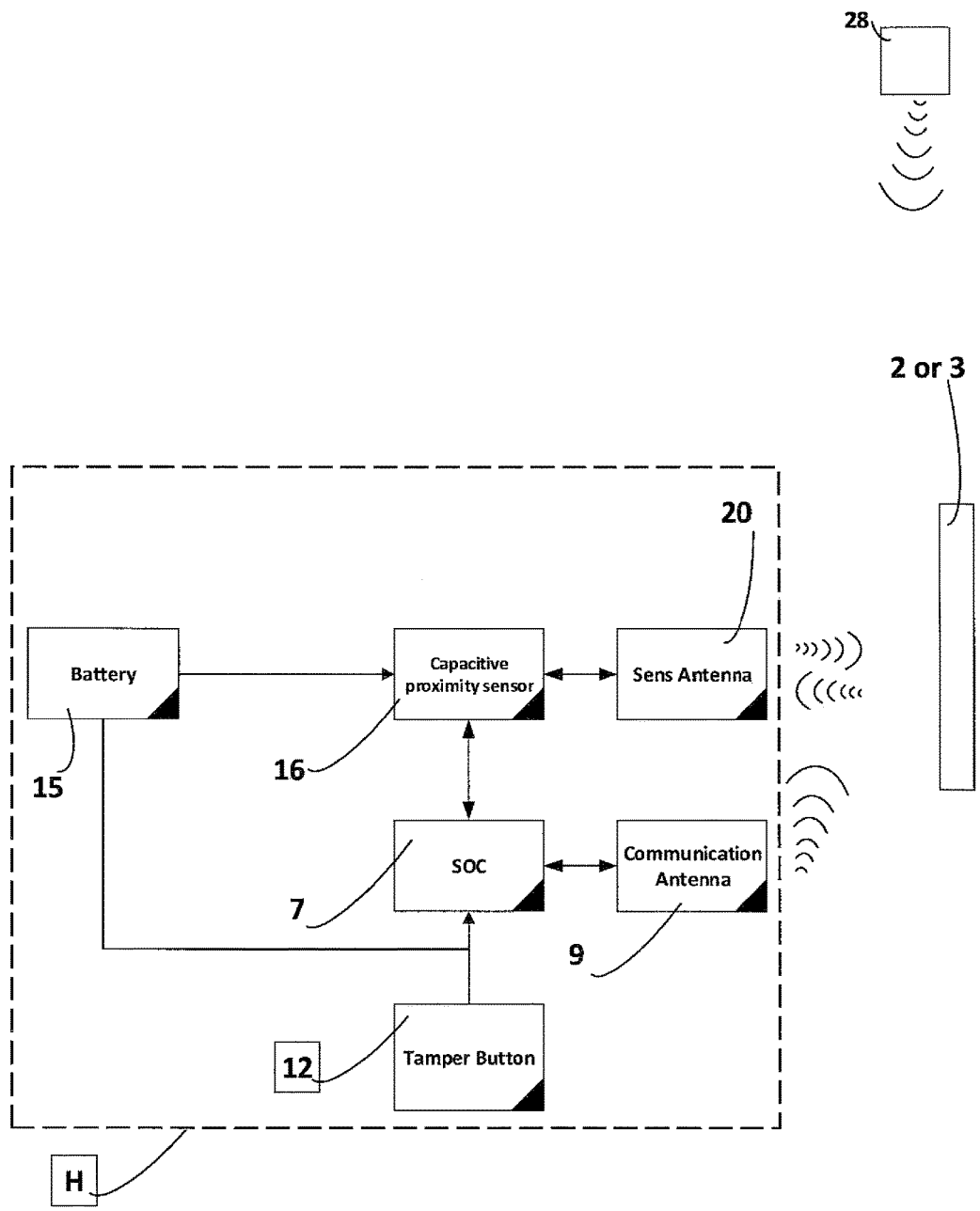

FIGS. 18 and 19 show a system which can be assembled on a door or a window. As in the examples shown on FIGS. 1-8 or FIG. 9. It can be arranged on door frame/door plate, or window frame/window plate. The system is based on a capacitance proximity detection for sensing the open or closed door/window state and preferably wirelessly communicates with an control panel 28. The antenna 9 provides for two-way communication with the control panel 28.

The capacitance proximity detection system includes a two-way transceiver element composed of elements 7 and 9, a battery 15, a capacitance proximity sensor 16, a system On Chip-SOC 7, a communication antenna 9, sensing antenna elements 19 and 20, a tamper button 12. The elements 19 and 20 can have different shape parameters depending on a type of the sensor (regular or recessed). The elements 19 and 20 are illustrated on FIGS. 21 and 22. They can be used as a sensing antenna for recessed (FIG. 18) and non-recessed (FIG. 19) capacitive proximity detection sensor.

The capacitance proximity detection sensor element is installed relative to the door frame 3 or the door plate 2 or the surface element 29. Is operative to sense changes in door/window/garage door open/close state.

A communication antenna 9 is provided for two-way communication between the fixed contact wireless transceiver element and the control panel 28. The communication antenna 9 is preferably an inverted F antenna operating on high frequency for communicating, for example, at 434, 868, 915 or 2445 MHz.

OnChip SOC 7 in FIG. 18, 19 is an integrated circuit (IC) that integrates all components into a single chip. It may contain digital, analog, mixed-signal, and often radio-frequency functions—all on a single chip substrate. EM357 manufactured by Silicon Labs Company is an example of the commonly used SOC. A battery element 15 supplies the required energy for the power elements 7, 16. The element 16 a capacitive proximity sensor.

In applications where proximity detection is required the system has several thresholds that could be configured with the SOC 7 via I2C interface. The capacitive proximity sensor 16 is an of the shelf IC device, for example it could be an IQS228AS Azoteq IC device.

While the door is closed, the capacitive proximity sensor 16 sense proximity to its components via the sensing antenna 20/19 connected to the capacitive proximity sensor 16. Once the door is opened the capacitive proximity sensor 16 via the sensing antenna 19/20 senses that there is no proximity to any object. When this is recognized by the capacitance sensor system the signal can supplied to the alarm unit 28. Then alarm system unit 28 will act according to its configuration. When a user leaves the object through the door passage he usually closes the door and activates the alarm system. When an unauthorized person opens the door, the sensor senses that the door plate is no longer in the proximity of the door frame and sends the signal to the alarm system unit 28.

Then the control panel 28 which can be configured as an alarm unit, such that it can activate an alarm, sends a signal to a user—for example to his cell phone, send a signal to a company which monitors security of the object, activate an alarm buzzer, turn on the light in an area of the object, lock all doors and windows, call police, call neighbors and etc., or all of this.

Figure 20:
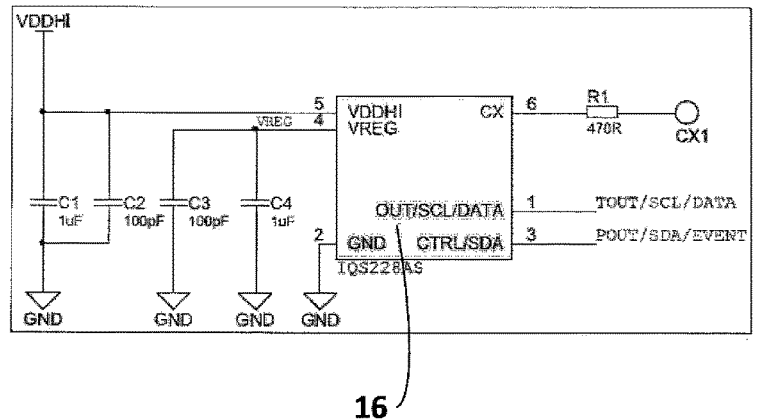
FIG. 20 shows a connection of a capacitive proximity element of the system according to the present invention.
Figure 20:
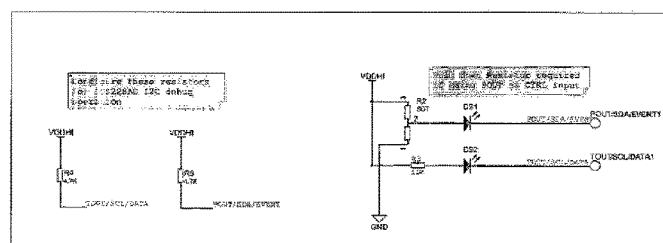

The system operates as follows: A user closes the door as in FIGS. 1, 3, 5 and 7. The capacitive proximity sensor 16 provides sensing through elements 19,20. The capacitive proximity sensor 16 indicates that there is a proximity to an object by generated voltage level. Once the door is open as in FIGS. 2, 6, 8 and 10, the capacitive proximity sensor 16 sense through the element 19120 that there is no proximity to an object. The capacitive proximity sensor 16 indicates that there is no proximity to an object by generating a different voltage level from in the proximity detection state. The details of connection of the capacitive proximity sensor 16 are illustrated in FIG. 20. The detailed construction of the sensing antennas elements 19,20 are illustrated in FIGS. 21, 22.

FIG. 20 shows a connection of the capacitive proximity element 16. The capacitive proximity sensor 16 senses proximity trough the antenna elements 19 or 20 depending on a type of the sensor. The element 19/20 are connected to CX1 point.

The capacitive proximity sensor 16 is an of the shelf IC device, for example it could be an IQS228AS Azoteq IC device. The shown circuit connection is valid for IQS228AS Azoteq IC device connection.

Figure 21:
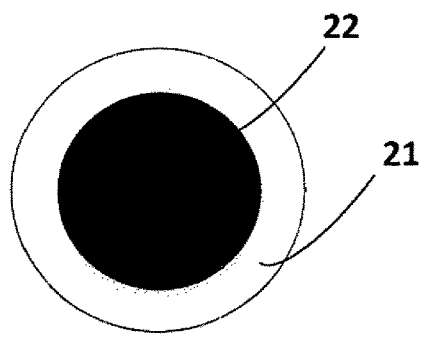
FIGS. 21 and 22 show antennas of the system according to the present invention.
Figure 21:
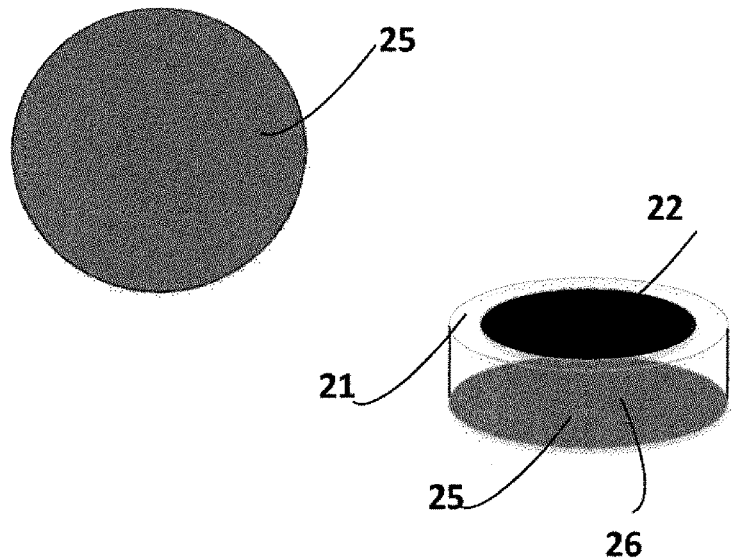
Figure 22:
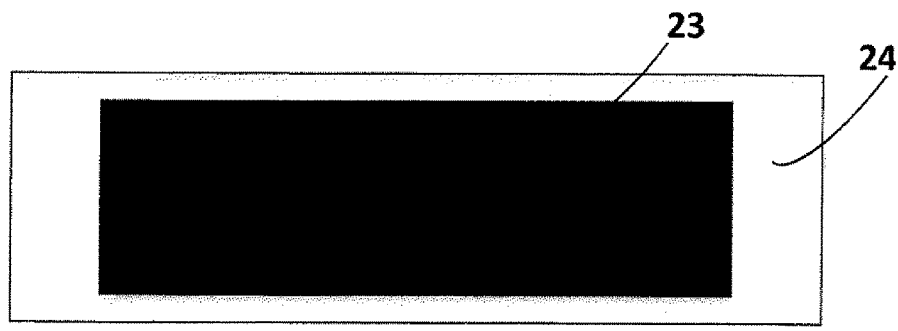
Figure 22:
Figure 22:
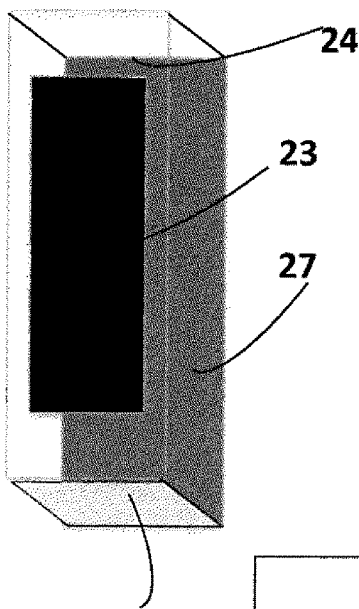

FIG. 21 shows an example of a recessed sensor sensing antenna. The antenna is composed of a dielectric material (elements 21, 26) and copper (elements 22,25).

The sensing antennas 19, 20 could have a top surface dielectric material (elements 24, 21), and it could be FR4 material. Elements 23, 27, 22, 26 have a copper material. In addition, dielectric material such as FR4 is provided between top and bottom layers (element 26).

FIG. 22 shows a sensor sensing antenna. The antenna is composed of a dielectric material (elements 24, 26) and copper (elements 23,27). The sensing antenna 19 and 20 has the same operation principle, but a different geometry. The antenna geometry corresponds to a sensor type. For a non-recessed capacitance sensor the antenna is rectangular, and for a recessed sensor antenna it is circular.

The antenna 19 and 20 have an antenna feed element 22, 23 connected to CX1 point in FIG. 20. The element 25, 27 of the antenna is a ground plane connected to a sensor ground.

The control panel 28 is a computer that can arm and disarm security systems, communicates with each installed component (door and window sensor, motion detector, glass break detector and etc.), sound the alarm when a security zone is breached and communicate with an alarm monitoring company, display each connected to the control panel sensor/sensor system status such as for systems for determine opening or closing state can display door/window opening or closing status, report sensor systems (the sensors that connected to the control panel) status to the Cloud., and also report self-status to the Cloud. (Self-status example: low battery lost WIFI signal).

The control panel can have a touchpad for easy programming and interaction, where pass codes are entered to arm and disarm the system, can work on voice commands, and can be programmed to work with wireless remote controls—key fobs.

The control panel can include a wireless transceiver for communication with alarm monitoring company, usually implemented via WiFi or cellular (GSM, CDMA and etc. . . . ), a wireless transceiver for communication with sensor if sensors/sensor systems connected wirelessly), and can use different wireless communication protocols. Usually those protocols are propriety protocols of the securities companies. The control panel can be provided with an alarm buzzer, a touch pad, a wired connection to sensor/sensors system that connects weirdly to the control panel, a telephone line connection (PSTN), support battery to supply the power to control panel if those will be detached from power source or there is a line power failure.

The control panel can be a security certified system or non-certified system (home automation system). It can be also a professionally monitored system, such that if the system is professionally monitored by an alarm company, they are alerted when a security problem arises in your home. Along with the high-decibel alarm that sounds, the monitoring company is alerted. A trained security expert might attempt to communicate with the homeowner via the control panel if it is setup for 2-Way Voice communication, or will call the emergency contact number listed on the account. These types of systems communicate with the monitoring company in one of several ways, including: over existing home phone lines, which continue to work during power outages when battery backup is in use, wirelessly through cellular radio frequencies like cell phones use, which also continue to work during power outages when battery backup is in use, voice over Internet Protocol (VoIP), which typically doesn't work in a power outage, via the Internet, which also typically does not work in a power outage.

In the event of an actual emergency, the monitoring company will notify the appropriate emergency response personnel in your area. This includes police, firefighters, and paramedics. The monitoring company will also try to maintain communication with you until emergency response teams arrive at your home.

Monitored systems typically allow the homeowners (or designees) to be notified by text message and email when a security breach occurs.

In the case of non-monitored systems, security systems available today that do not include professionally monitored services. In the event of a home intrusion when this type of security system is installed, a high-decibel alarm sounds (provided one is installed). Contacting police, fire, or other emergency response personnel must be initiated by the homeowner by dialing the appropriate number, typically 911.

These types of systems may or may not allow for text messages or email notifications to be sent to the homeowner in the event of a security breach, depending on the provider and the system a user opted for.

The control panel for home automation could be monitored and non-monitored systems and certified for security or non-certified. They include all the features of mention above control panel plus monitoring your home/building automatically and collecting information from peripheral device that connected to it such light, thermostats cameras, motion detectors and door open close system/sensors, and etc.

The system according to the present invention operates with radio frequency, optical or capacitance sensors as shown in FIGS. 10, 11, 15, 16, 18, 19. It communicate with the control Panel 28 via the communication antenna 9, wirelessly, for transmitting door window, open/closed status. However a wired connection of the radio frequency,

The invention claimed is:

1. A system for determining closed and open states of closeable and openable passages of an object, comprising
    components which are configured to determine whether a closeable and openable passage is in an open state or in a closed state and which are all arranged exclusively on one spot associated with the passage providing closing and opening of the passage,
    wherein the all components are arranged in a ground, or in a threshold adjoining a residence, or recessed in a component of the passage.

2. The system of claim 1, wherein the system includes means for preliminary calibration and subsequent determination of the open state of the system based on deviation of obtained calibration data.

3. The system of claim 1, wherein the components include a proximity antenna and a communication antenna configured so that when the system transmits through the proximity antenna a signal is supplied to the proximity antenna through one feed element, when the system transmits through the communication antenna a signal is supplied through another feed element, and when the same antenna is used for communication and for proximity detection a proximity detection signal and a communication signal are supplied through a same feed but in different time frames.

4. The system of claim 1, wherein the components include a reflection lens so that a light waveform is transmitted through the reflection lens from a door plate and light is reflected from a door frame through the lends to a sensor which measures for each wave light transition a time of light in comparison to a time of light when the sensor was calibrated, to thusly identify whether a door is open or closed, and the lens provides spinning of an optical sensor wave by 45 degrees.

5. A method for determining closed and open states of closeable and openable passages of an object, comprising
    configuring components to determine whether a closeable and openable passage is in an open state or in a closed state; and arranging all components exclusively on one element associated with the passage providing closing and opening of the passage, and arranging the all components arranged in a ground, or in a threshold adjoining a residence, or recessed in a component of the passage.

6. The method of claim 5, wherein the method includes carrying out preliminary calibration and subsequent determination of the open state of the system based on deviation of obtained calibration data.

7. The method of claim 5, wherein the components include a proximity antenna and a communication antenna operating so that when the system transmits through the proximity antenna a signal is supplied to the proximity antenna through one feed element, when the system transmits through the communication antenna a signal is supplied through another feed element, and when the same antenna is used for communication and for proximity detection a proximity detection signal and a communication signal are supplied through a same feed but in different time frames.

8. The method of claim 5, wherein the components include a reflection lens operating so that so that a light waveform is transmitted through the reflection lens from a door plate and light is reflected from a door frame through the lends to a sensor which measures for each wave light transition a time of light in comparison to a time of light when the sensor was calibrated, to thusly identify whether a door is open or closed, and the lens provides spinning of an optical sensor wave by 45 degrees.

* * * * *